(12) United States Patent
Huang et al.

(10) Patent No.: US 10,849,325 B2
(45) Date of Patent: Dec. 1, 2020

(54) INTELLIGENT DEHUMIDIFICATION DEVICE FOR HOT AIR CIRCULATION BAKING SYSTEM

(71) Applicant: Hunan University of Science and Technology, Hunan (CN)

(72) Inventors: Cailun Huang, Hunan (CN); Yongjun Tian, Hunan (CN); Jing Wang, Hunan (CN); Nian Zhang, Hunan (CN); Li Ouyang, Hunan (CN); Junwei Zhu, Hunan (CN); Kaixuan Zhang, Hunan (CN); Xiongsheng Yi, Hunan (CN)

(73) Assignee: Hunan University of Science and Technology, Xingtan (CN)

( * ) Notice: Subject to any disclaimer, the term of this patent is extended or adjusted under 35 U.S.C. 154(b) by 84 days.

(21) Appl. No.: 16/236,174

(22) Filed: Dec. 28, 2018

(65) Prior Publication Data
US 2019/0274316 A1    Sep. 12, 2019

(30) Foreign Application Priority Data
Mar. 12, 2018 (CN) .......................... 2018 1 0198533

(51) Int. Cl.
*F25B 47/02* (2006.01)
*A21B 3/04* (2006.01)
(Continued)

(52) U.S. Cl.
CPC .................. *A21B 3/04* (2013.01); *A21B 1/26* (2013.01); *A21B 1/40* (2013.01); *F25B 47/02* (2013.01);
(Continued)

(58) Field of Classification Search
CPC ........ F24F 3/14; F24F 3/02; F24F 3/04; F24F 3/06; F24F 3/065; F24F 3/08; F24F 3/10; A21B 3/04
See application file for complete search history.

(56) References Cited

U.S. PATENT DOCUMENTS

| 4,770,888 A | * | 9/1988 | Loeb | ........................ | A21B 3/04 426/520 |
| 5,171,974 A | * | 12/1992 | Koether | .................... | F24C 7/08 219/413 |

(Continued)

FOREIGN PATENT DOCUMENTS

| CA | 2961470 A1 | 5/2017 |
| CN | 105758160 A | 7/2016 |
| CN | 206410479 U | 8/2017 |

*Primary Examiner* — David J Teitelbaum
(74) *Attorney, Agent, or Firm* — Wayne & Ken, LLC; Tony Hom

(57) ABSTRACT

The invention disclosed an intelligent dehumidification device for a hot air circulation baking system, which internally includes a compressor, a condenser, a throttle valve, an evaporator, a total heat exchanger, a controller, a heat dissipation fan, a liquid level sensor, a temperature and humidity sensor, an axial flow fan, a drain solenoid valve, a condensate collecting box and a temperature sensor and externally includes a dehumidification air inlet, a dehumidification air outlet, a fresh air inlet, a heat dissipation air outlet and a condensate discharge port. The beneficial effects of present application are recovery of internal circulation waste heat, non-emission intelligent dehumidification and preservation of beneficial ingredients of the baked product for the hot air circulation baking system during the baking process can be realized, and functions of grid overpressure and undervoltage detection and protection, compressor overheat protection, delayed start after compressor shutdown, automatic condensate discharge can be achieved.

4 Claims, 3 Drawing Sheets

(51) Int. Cl.
*A21B 1/26* (2006.01)
*A21B 1/40* (2006.01)
*F28D 20/00* (2006.01)
*F28F 3/10* (2006.01)

(52) U.S. Cl.
CPC ............ *F28D 20/00* (2013.01); *F25B 47/022* (2013.01); *F25B 47/025* (2013.01); *F28F 3/10* (2013.01)

(56) References Cited

U.S. PATENT DOCUMENTS

| | | | | |
|---|---|---|---|---|
| 2004/0200823 | A1* | 10/2004 | Paller | A21C 13/00 219/400 |
| 2008/0282702 | A1 | 11/2008 | Collins | |
| 2016/0077678 | A1* | 3/2016 | Reese | A21D 8/06 99/342 |

* cited by examiner

INTELLIGENT DEHUMIDIFICATION DEVICE FOR HOT AIR CIRCULATION BAKING SYSTEM

CROSS-REFERENCE TO RELATED APPLICATIONS

This application claims the benefit of priority from Chinese Application No. 201810198533.3, filed on Mar. 12, 2018. The content of the aforementioned application, including any intervening amendments thereto, is incorporated herein by reference in its entirety.

TECHNICAL FIELD

The present disclosure relates to an energy-saving and environmental-friendly baking device, in particular to an intelligent dehumidification device for a hot air circulation baking system.

BACKGROUND OF THE PRESENT INVENTION

In the 21st century, with the development of China's chemical industry, food, light industry and heavy industry, the research and application of hot air circulation baking system has once again become a research boom. The hot air circulation baking system mainly has two forms: hot air circulation oven and hot air circulation drying box. Generally, the baking device with heating tube and circulating fan can be called hot air circulation baking system, because regardless of the structure of the oven (horizontal or vertical air supply), the result is that hot air circulates on the surface, which can be called hot air circulation oven, such as electric blast oven, high temperature sterilization oven. Hot air circulation baking system is suitable for heating, solidification, drying and dehydration of materials and products in pharmaceutical, chemical, food, agricultural and sideline products, aquatic products, light industry, heavy industry, etc.; such as raw materials, crude drugs, Chinese herbal medicines, extracts, powders, granules, infusions, water pills, packaging bottles, pigment dyes, dehydrated vegetables, dried melons, sausages, plastic resins, electrical components, baking varnish, etc. Hot air circulation oven is a substitute for traditional drying room. After several upgrades, the thermal efficiency of the oven has increased from 3-7% in the traditional drying room to about 45% at present (with a maximum of 50%), reaching the advanced level at home and abroad. In 1990, the National Pharmaceutical Administration issued an industry standard. The model is unified as RXH, which is supplemented with steam and the steam is then discharged from the dehumidification discharge port. Fresh air is continuously replenished and hot and humid air is continuously discharged, so that a proper relative humidity within the oven is maintained. The oven is featured in that most of the hot air is circulated therein, thereby increasing heat transfer and saving energy. It uses forced air to reduce the temperature difference between the upper and lower parts.

Baking is a key factor in determining the quality of baked product. Advanced baking equipment is the basis for accurately achieving the scientific baking process, improving the quality of baked product, and reducing labor intensity and production costs. For traditional baking room, the baking quality is not high, the energy consumption is serious, and the environment is polluted. Comparatively, the existing hot air circulation baking system adopts forced air circulation and is equipped with a temperature and humidity automatic control system, which is suitable for a large amount of baking, saves time and labor, saves energy and protects the environment, and achieves high quality of baked product. It meets the requirements of sustainable development. Therefore, the hot air circulation baking system has been promoted and used at home and abroad.

In view of the strong air dehumidification method of the existing hot air circulation baking system, the dehumidification process not only takes away the potential heat in the warm and humid gas and causes energy loss, but also takes away the beneficial ingredients emitted by the baked product and thus affects the quality of the baked product. Therefore, it is necessary to develop an intelligent dehumidification device for a hot air circulation baking system.

SUMMARY OF THE PRESENT INVENTION

In order to overcome the problems of low energy utilization and poor baking quality of the existing hot air circulation baking system, the present disclosure discloses an intelligent dehumidification device for a hot air circulation baking system.

The solution adopted by the present disclosure to solve the technical problem is: an intelligent dehumidification device for a hot air circulation baking system, which internally includes a compressor, a condenser, a throttle valve, an evaporator, a total heat exchanger, a controller, a heat dissipation fan, a liquid level sensor, a temperature and humidity sensor, an axial flow fan, a drain solenoid valve, a condensate collecting box and a temperature sensor and externally includes a dehumidification air inlet, a dehumidification air outlet, a fresh air inlet, a heat dissipation air outlet and a condensate discharge port; the dehumidification device including:

a dehumidification airflow passage including the dehumidification air inlet, the axial flow fan, the total heat exchanger, the evaporator, the total heat exchanger, and the dehumidification air outlet that are arranged and communicated in sequence;

a heat dissipation airflow passage including the fresh air inlet, the condenser, the heat dissipation fan and the heat dissipation air outlet that are arranged and communicated in sequence;

a refrigerant circulation loop including the compressor, the condenser, the throttle valve, the evaporator and the compressor that are arranged and communicated in sequence;

a dehumidification water passage including the evaporator, the condensate collecting box, the drain solenoid valve and the condensate discharge port that are arranged and communicated in sequence;

wherein the controller acquires real-time operating parameters of the dehumidification device through the liquid level sensor, the temperature and humidity sensor and the temperature sensor, and intelligently controls operation conditions of the compressor, the heat dissipation fan, the axial flow fan and the drain solenoid valve by an embedded algorithm and a control program according to a baking process curve of a baked product, to enable the dehumidification airflow passage, the heat dissipation airflow passage, the refrigerant circulation loop and the dehumidification water passage to operate coordinately to realize recovery of internal circulation waste heat, non-emission intelligent dehumidification and preservation of beneficial ingredients of the baked product for the hot air circulation baking system during the baking process.

In the present disclosure, the dehumidification air inlet and the dehumidification air outlet of the dehumidification air passage are respectively connected with a dehumidification discharge port and a fresh air intake port of the hot air circulation baking system through air ducts, and the high temperature and high humidity airflow at the dehumidification discharge port of the hot air circulation baking system enters the total heat exchanger under the action of the axial flow fan, becomes low-temperature and high-humidity airflow after heat exchange with dehumidified low-temperature and low-humidity airflow and is sent to evaporator for dehumidification, and the dehumidified low-temperature and low-humidity airflow is returned to the fresh air intake port of the hot air circulation baking system through the dehumidification air outlet after heat exchange with high-temperature and high-humidity airflow entering through the dehumidification air inlet, to form an inner circulation loop which has no discharge and is able to recover waste heat during dehumidification and effectively preserve beneficial components of the baked product;

the refrigerant circulation loop together with the heat dissipation airflow passage converts air energy introduced by the fresh air inlet into kinetic energy required for dehumidification of the evaporator to achieve energy-saving dehumidification;

the liquid level sensor detects liquid level of condensate in the condensate collecting box, when it is detected that the condensate liquid level reaches an upper limit, the controller issues a control command to open the drain solenoid valve and drain through the condensate discharge port, and when it is detected that the liquid level reaches a lower limit, the controller issues a control command to close the drain solenoid valve to stop draining, to realize intelligent condensate draining.

In the present disclosure, the controller includes a data acquisition module, a relay and a relay driving module, a main control CPU, a program and data memory, an LCD touch display screen, a communication interface, and a power management module;

the data acquisition module is configured to collect temperature and humidity of hot air from the dehumidification discharge port of the hot air circulation baking system by the temperature and humidity sensor, collect temperature of the compressor during operation by the temperature sensor, and collect the liquid level in the condensate collecting box by the liquid level sensor, the relay and the relay driving module are configured to start or stop operation of the compressor, the axial flow fan, the heat dissipation fan and the drain solenoid valve according to an instruction of the main control CPU, the program and data memory is configured to store operating programs, baking process parameters and baking process data of the dehumidification device, the LCD touch display is configured to realize man-machine interaction for local setting and modifying the baking process parameters of the dehumidification device, the communication interface is configured to achieve remote communication with an upper computer to realize remote monitoring of the dehumidification process and remote configuration of the baking process parameters, the power management module is configured to obtain AC power from the utility power and convert it to DC operation power required for the main control CPU and its peripheral circuits, and the main control CPU collects state parameters of the dehumidification process in real time through the data acquisition module and the sensor, obtains control quantity by the embedded algorithm and the control program and outputs a control signal to the relay and the relay driving module according to the baking process parameters preset by the LCD touch display screen or the upper computer to control operations of the compressor, the axial flow fan, the heat dissipation fan, the drain solenoid valve to achieve automated and intelligent dehumidification process.

In the present disclosure, the embedded algorithm and the control program adopt an expert fuzzy control algorithm to realize intelligent dehumidification of the hot air circulation baking system, and integrate program function modules for grid overpressure and undervoltage detection and protection, compressor overheat protection, delayed start after compressor shutdown, automatic condensate discharge, remote monitoring and configuration and touch screen key value scanning, to reliably achieve intelligent dehumidification of the hot air circulation baking system.

The present application has the beneficial effects that the dehumidification device is provided with a dehumidification airflow passage, a heat dissipation airflow passage, a refrigerant circulation loop, a dehumidification water passage and a controller embedded algorithm and a control program. Recovery of internal circulation waste heat, non-emission intelligent dehumidification and preservation of beneficial ingredients of the baked product for the hot air circulation baking system during the baking process can be realized. The device is integrated with functions of grid overpressure and undervoltage detection and protection, compressor overheat protection, delayed start after compressor shutdown, automatic condensate discharge, remote monitoring and configuration and touch screen key value scanning, thereby reliably achieving intelligent dehumidification of the hot air circulation baking system.

In the figure: 1. compressor, 2. condenser, 3. throttle valve, 4. evaporator, 5. total heat exchanger, 6. controller, 7. heat dissipation fan, 8. liquid level sensor, 9. temperature and humidity sensor, 10. axial flow fan, 11. drain solenoid valve, 12. condensate collecting box, 13. dehumidification air inlet, 14. dehumidification air outlet, 15. fresh air inlet, 16. heat dissipation air outlet, 17. condensate discharge port, 18. temperature sensor, 19. air duct, 101. dehumidification air passage, 102. heat dissipation air passage, 103. refrigerant circulation loop, 104. dehumidification water passage, 100. dehumidification device, 200. hot air circulation baking system, 201. dehumidification discharge port, 202. fresh air intake port.

Figure 2:
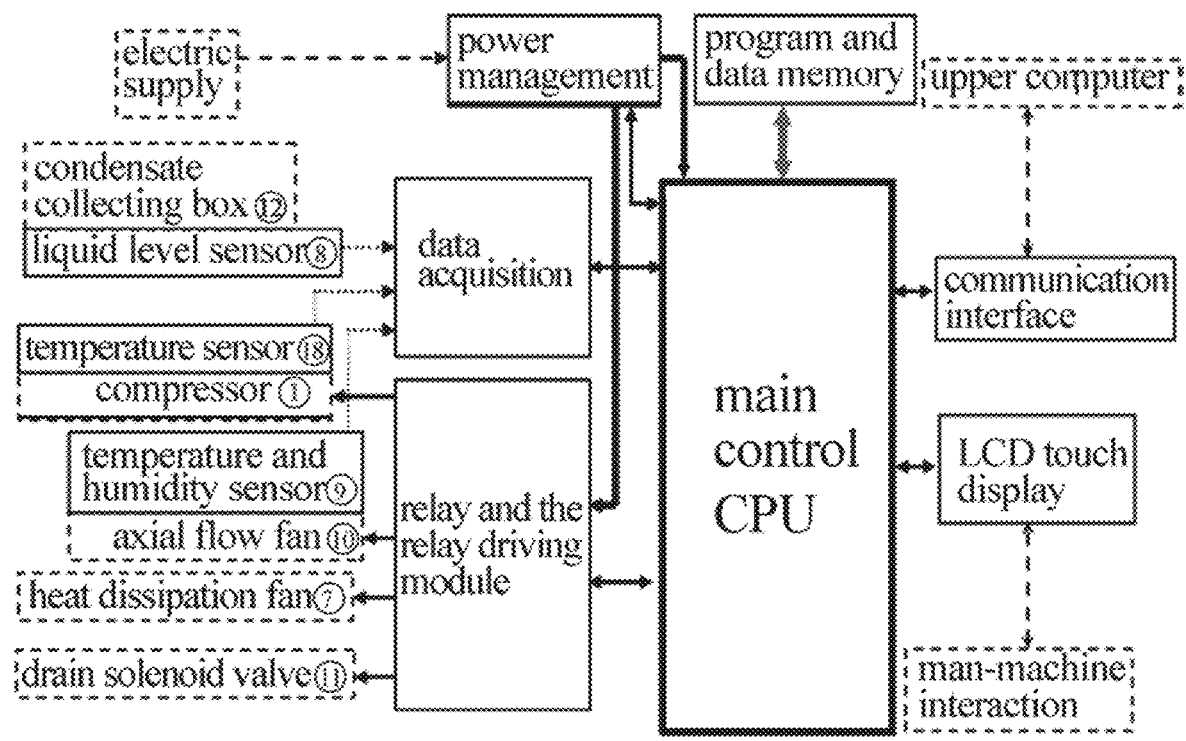

FIG. 2 is a block diagram showing the structure of an embodiment of a controller of the present disclosure.

Figure 3:
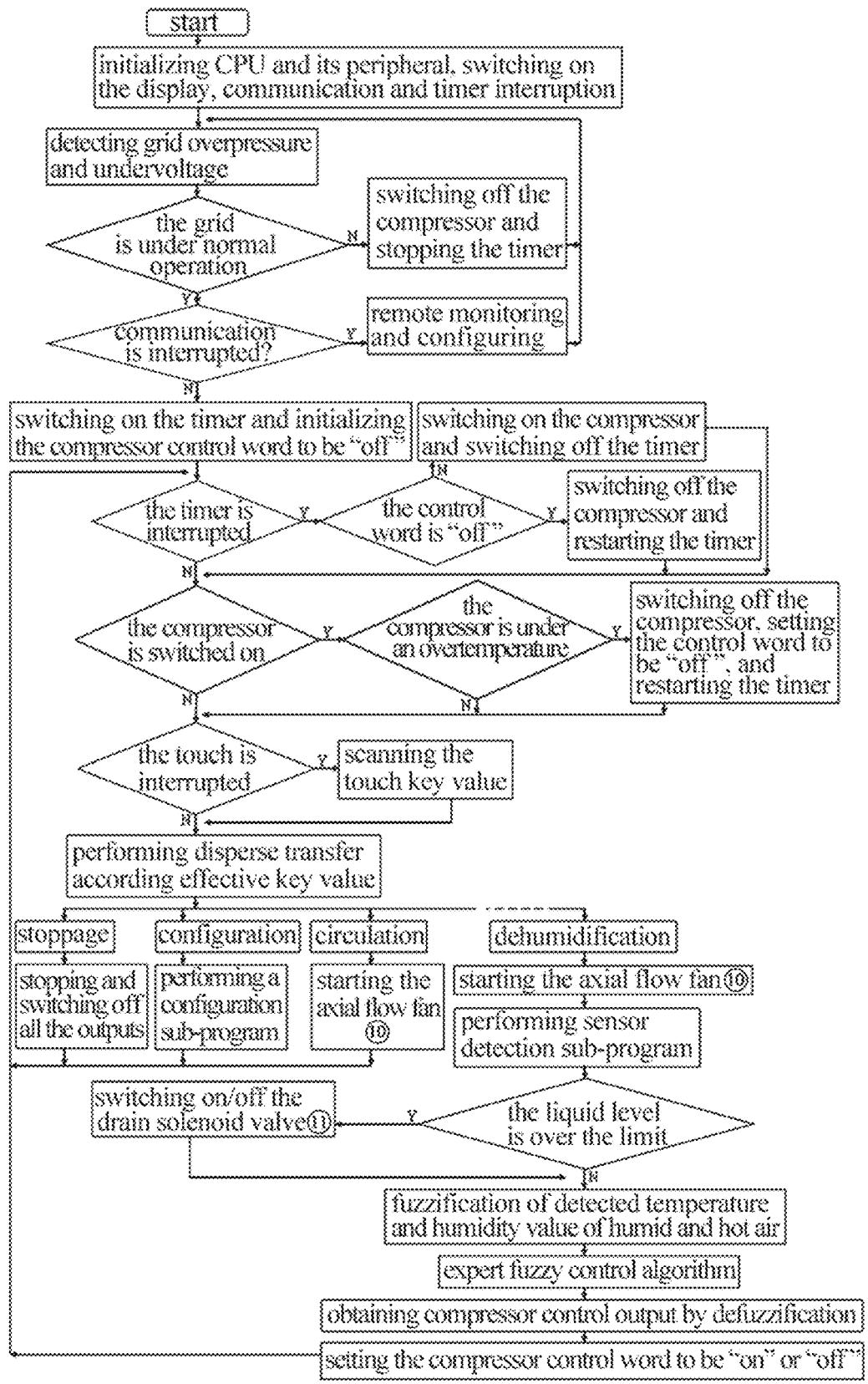

FIG. 3 is a block diagram of an embodiment of an embedded algorithm and control program of the present disclosure.

DETAILED DESCRIPTION OF THE PRESENT DISCLOSURE

The technical solutions in the embodiments of the present disclosure are clearly and completely described in the following with reference to the accompanying drawings in the embodiments of the present disclosure. It is obvious that the described embodiments are only a part of the embodiments of the present disclosure, but not all embodiments. All other embodiments obtained by those skilled in the art based on the embodiments of the present disclosure without creative efforts are within the scope of the present disclosure.

Figure 1:
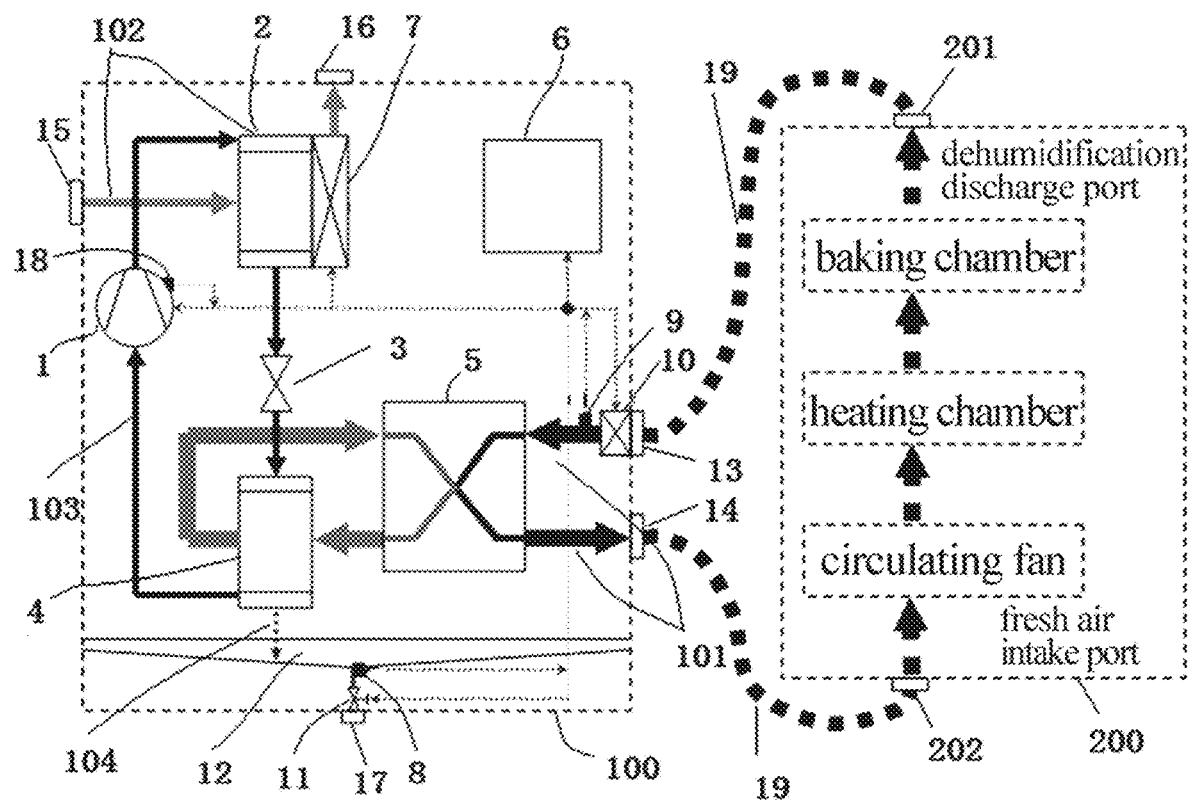
FIG. 1 is a schematic view of the overall structure of the present disclosure.

Referring to the drawings, FIG. 1 is a schematic view of the overall structure of the present disclosure. An intelligent dehumidification device for a hot air circulation baking system, which internally includes a compressor 1, a condenser 2, a throttle valve 3, an evaporator 4, a total heat exchanger 5, a controller 6, a heat dissipation fan 7, a liquid level sensor 8, a temperature and humidity sensor 9, an axial flow fan 10, a drain solenoid valve 11, a condensate collecting box 12 and a temperature sensor 18 and externally includes a dehumidification air inlet 13, a dehumidification air outlet 14, a fresh air inlet 15, a heat dissipation air outlet 16 and a condensate discharge port 17; the dehumidification device 100 including: a dehumidification airflow passage 101 including the dehumidification air inlet 13, the axial flow fan 10, the total heat exchanger 5, the evaporator 4, the total heat exchanger 5, and the dehumidification air outlet 14 that are arranged and communicated in sequence; a heat dissipation airflow passage 102 including the fresh air inlet 15, the condenser 2, the heat dissipation fan 7 and the heat dissipation air outlet 16 that are arranged and communicated in sequence; a refrigerant circulation loop 103 including the compressor 1, the condenser 2, the throttle valve 3, the evaporator 4 and the compressor 1 that are arranged and communicated in sequence; a dehumidification water passage 104 including the evaporator 4, the condensate collecting box 12, the drain solenoid valve 11 and the condensate discharge port 17 that are arranged and communicated in sequence; wherein the controller 6 acquires real-time operating parameters of the dehumidification device 100 through the liquid level sensor 8, the temperature and humidity sensor 9 and the temperature sensor 18, and intelligently controls operation conditions of the compressor 1, the heat dissipation fan 7, the axial flow fan 10 and the drain solenoid valve 11 by an embedded algorithm and a control program according to a baking process curve of a baked product, to enable the dehumidification airflow passage 101, the heat dissipation airflow passage 102, the refrigerant circulation loop 103 and the dehumidification water passage 104 to operate coordinately to realize recovery of internal circulation waste heat, non-emission intelligent dehumidification and preservation of beneficial ingredients of the baked product for the hot air circulation baking system 200 during the baking process. The dehumidification device 100 of the present disclosure includes a dehumidification structure of a green barn and a dehumidification mode of internal circulation, where a refrigerant is converted into a high-temperature and high-pressure gas after flowing through a compressor, and after being cooled by the condenser, the high-temperature and high-pressure gas is liquefied and dissipates heats and is changed into a low-temperature high-pressure liquefied working fluid, while the heat is discharged to the outside through the heat dissipation airflow passage. The working fluid passes through the throttle valve and becomes a low-temperature and low-pressure liquid. After entering the evaporator, the low-temperature and low-pressure working fluid vaporizes and absorbs heat due to sudden increase of space and thus decrease of pressure. The result is that, the water vapor flowing through the evaporator from the hot airflow in the hot air circulation baking system reaches a dew point to form condensate, the vaporized working fluid is returned to the compressor, and the condensate is collected and discharged from the outlet pipe.

In the present disclosure, the dehumidification air inlet 13 and the dehumidification air outlet 14 of the dehumidification air passage 101 are respectively connected with a dehumidification discharge port 201 and a fresh air intake port 202 of the hot air circulation baking system 200 through air ducts 19, and the high temperature and high humidity airflow at the dehumidification discharge port 201 of the hot air circulation baking system 200 enters the total heat exchanger 5 under the action of the axial flow fan 10, becomes low-temperature and high-humidity airflow after heat exchange 5 with dehumidified low-temperature and low-humidity airflow and is sent to evaporator 4 for dehumidification, and the dehumidified low-temperature and low-humidity airflow is returned to the fresh air intake port 202 of the hot air circulation baking system through the dehumidification air outlet 14 after heat exchange with high-temperature and high-humidity airflow entering through the dehumidification air inlet 13, to form an inner circulation loop which has no discharge and is able to recover waste heat during dehumidification and effectively preserve beneficial components of the baked product; the refrigerant circulation loop 103 together with the heat dissipation airflow passage 102 converts air energy introduced by the fresh air inlet 15 into kinetic energy required for dehumidification of the evaporator 4 to achieve energy-saving dehumidification; the liquid level sensor 8 detects liquid level of condensate in the condensate collecting box 12, when it is detected that the condensate liquid level reaches an upper limit, the controller issues a control command to open the drain solenoid valve 11 and drain through the condensate discharge port 17, and when it is detected that the liquid level reaches a lower limit, the controller issues a control command to close the drain solenoid valve 11 to stop draining, to realize intelligent condensate draining. In the dehumidification device of the present disclosure, the total heat exchanger 5 is substantially a total heat exchange core, and the hot and humid air discharged from the hot air circulation baking system 200 and the low temperature dry air passing through the evaporator 4 pass through the heat exchange plate and then sent separately to the evaporator 4 and the hot air circulation baking system 200, to achieve the effects of both dehumidification and maintaining a stable gas flow temperature (recovery of waste heat). A high-temperature high-pressure refrigerant gas is formed after the compressor 1 working on the refrigerant, and the refrigerant gas flows to the condenser 2. The outdoor air entering through the fresh air inlet 15 dissipates heat to the condenser 2, passes through the heat-dissipating fan 7 and is discharged from the heat-dissipating air outlet 16. The refrigerant of the condenser 2 becomes a low-temperature high-pressure liquefied refrigerant and then flows through the throttle valve 3. The refrigerant passes through the throttle valve 3 and becomes a low-temperature low-pressure liquefied refrigerant, which is sent to the evaporator 4. The refrigerant entering the evaporator 4 would be gasified and absorb heat due to sudden increase of space and reduce of pressure, and thus the surface temperature of the evaporator 4 drastically decreases. The vaporized low temperature and low pressure refrigerant is returned to the compressor 1 so as to recirculate to maintain the surface of the evaporator 4 at a low temperature. Thus, after the humid hot air from the hot air circulation baking system 200 passes through the dehumidification air inlet 13, the axial flow fan 10, and the total heat exchanger 5 to the evaporator 4, the temperature is greatly reduced. The air humidity is in a supersaturated state, the redundant water vapor is precipitated in the form of condensate and condenses on the fins of the evaporator, that is, "condensation". The "condensation" forms condensate and flows to the condensate collecting box 12, and then passes through the drain solenoid valve 11, the condensate discharge port 17 and is discharged to the outside of the dehumidification device 100 of the present disclosure.

FIG. 2 is a block diagram showing the structure of an embodiment of a controller of the present disclosure. The controller 6 includes a data acquisition module, a relay and a relay driving module, a main control CPU, a program and data memory, an LCD touch display screen, a communication interface, and a power management module; the data acquisition module is configured to collect temperature and humidity of hot air from the dehumidification discharge port of the hot air circulation baking system by the temperature and humidity sensor 9, collect temperature of the compressor 1 during operation by the temperature sensor 18, and collect the liquid level in the condensate collecting box 12 by the liquid level sensor 8, the relay and the relay driving module are configured to start or stop operation of the compressor 1, the axial flow fan 10, the heat dissipation fan 7 and the drain solenoid valve 11 according to an instruction of the main control CPU, the program and data memory is configured to store operating programs, baking process parameters and baking process data of the dehumidification device, the LCD touch display is configured to realize man-machine interaction for local setting and modifying the baking process parameters of the dehumidification device, the communication interface is configured to achieve remote communication with an upper computer to realize remote monitoring of the dehumidification process and remote configuration of the baking process parameters, the power management module is configured to obtain AC power from the utility power and convert it to DC operation power required for the main control CPU and its peripheral circuits, and the main control CPU collects state parameters of the dehumidification process in real time through the data acquisition module and the sensor, obtains control quantity by the embedded algorithm and the control program and outputs a control signal to the relay and the relay driving module according to the baking process parameters preset by the LCD touch display screen or the upper computer to control operations of the compressor 1, the axial flow fan 10, the heat dissipation fan 7, the drain solenoid valve 11 to achieve automated and intelligent dehumidification process. In the dehumidification device 200 of the present disclosure, since the compression pump may be encountered with various unavoidable bad conditions during the dehumidification process, it is necessary to apply certain protective preservation measures. The typical conditions often encountered in the operation of the compression pump are as follows: (1) In case that the deviation of the rated working voltage is large, it would cause overload heating of the air-conditioning compression motor; (2) In case that the compression pump is stopped for a short time and then restarted, because the high-pressure end of the pipeline refrigerant has not yet been completely released, and at this time, the compressor motor is energized to be overloaded, the motor is exerted a too strong force to be able to rotate normally. (3) In case that the refrigerant in the compressor leaks, it would cause the heat generated by idling of the compression pump motor to be unable to dissipate and release by the refrigerant liquid as in normal operation and thus heating of the compression pump; (4) In case that the compression pump is aging, the power is decreased, the internal frictional resistance is increased, and the like, the heat generation of the compression pump is increased. In view of the above various reasons, the present disclosure installs a temperature sensor 18 on the outer casing of the compressor 1, and when the main control CPU detects that the temperature of the compressor casing exceeds the limit value, it immediately issues an instruction to cut off the working power of the compressor through the relay and the relay driving module; the main control CPU monitors the grid voltage in real time through the power management module. When the grid has overvoltage and undervoltage, the compressor is prohibited from starting. Each time when the compressor is stopped, the main control CPU automatically counts. When the shutdown time does not reach a specified limit, the compressor is prohibited from starting. In the process of dehumidification, the amount of condensate collected is related to the water vapor content of the hot and humid air discharged from the dehumidification discharge port of the hot air circulation baking system. In order to adapt to different hot air circulation baking systems and dehumidification in different baking stages, in the present disclosure, a liquid level sensor 8 is installed at the bottom of the condensate collecting box 12. When the main control CPU detects that the liquid level of the condensate collecting box reaches the prescribed upper limit, it immediately issues a command to open the drain solenoid valve 11 through the relay and the relay driving module to drain through the condensate drain port 17, and when the detected liquid level is lower than the prescribed lower limit, the electromagnetic valve 11 is closed to stop the drainage, so as to prevent the electromagnetic valve from being damaged due to long-term energization and operation.

FIG. 3 is a block diagram of an embodiment of an embedded algorithm and control program of the present disclosure. The embedded algorithm and the control program adopt an expert fuzzy control algorithm to realize intelligent dehumidification of the hot air circulation baking system, and integrate program function modules for grid overpressure and undervoltage detection and protection, compressor overheat protection, delayed start after compressor shutdown, automatic condensate discharge, remote monitoring and configuration and touch screen key value scanning, to reliably achieve intelligent dehumidification of the hot air circulation baking system. The embedded algorithm and control of the present disclosure is realized by an expert fuzzy control system, which is a product of the combination of expert system technology and fuzzy control technology. Expert system technology is introduced into fuzzy control, so as to further improve the intelligence level of the fuzzy controller. Expert fuzzy control maintains the value of rule-based approach and the flexibility brought by fuzzy algorithm, while combining the expression of expert system technology with algorithm knowledge. Expert system technology considers more aspects. For example, for composition of knowledge, how to organize, how to express, how to apply knowledge, and so on are considered. The expert system approach emphasizes multi-level knowledge and need for classification, as well as the computer organization that uses the knowledge to reason. Combining fuzzy control with expert system can express and utilize the heuristic knowledge needed to control complex processes and objects, pay attention to multi-level knowledge and need for classification, and make up for the shortcomings that the fuzzy controller structure is too simple and the rule lacks diversity, thereby endowing fuzzy control with higher intelligence; the combination of the two can also have complex knowledge of process control, and can effectively use the knowledge in more complicated situations.

In summary, the present disclosure discloses an intelligent dehumidification device for a hot air circulation baking system, which internally includes a compressor 1, a condenser 2, a throttle valve 3, an evaporator 4, a total heat exchanger 5, a controller 6, a heat dissipation fan 7, a liquid level sensor 8, a temperature and humidity sensor 9, an axial flow fan 10, a drain solenoid valve 11, a condensate collecting box 12 and a temperature sensor 18 and externally includes a dehumidification air inlet 13, a dehumidification air outlet 14, a fresh air inlet 15, a heat dissipation air outlet 16 and a condensate discharge port 17. The present application has the beneficial effects that the dehumidification device is provided with a dehumidification airflow passage 101, a heat dissipation airflow passage 102, a refrigerant circulation loop 103, a dehumidification water passage 104 and a controller 6 embedded algorithm and a control program. Recovery of internal circulation waste heat, non-emission intelligent dehumidification and preservation of beneficial ingredients of the baked product for the hot air circulation baking system 200 during the baking process can be realized. The dehumidification device 100 is integrated with functions of grid overpressure and undervoltage detection and protection, compressor overheat protection, delayed start after compressor shutdown, automatic condensate discharge, remote monitoring and configuration and touch screen key value scanning, thereby reliably achieving intelligent dehumidification of the hot air circulation baking system 200.

The above is only the preferred embodiment of the present disclosure, and is not intended to limit the present disclosure. Any modifications, equivalent substitutions, improvements, etc., which are within the spirit and scope of the present disclosure, should be included within the protection scope of the present disclosure.

What is claimed is:

1. An intelligent dehumidification device for a hot air circulation baking system, which internally comprises a compressor, a condenser, a throttle valve, an evaporator, a total heat exchanger, a controller, a heat dissipation fan, a liquid level sensor, a temperature and humidity sensor, an axial flow fan, a drain solenoid valve, a condensate collecting box and a temperature sensor and externally comprises a dehumidification air inlet, a dehumidification air outlet, a fresh air inlet, a heat dissipation air outlet and a condensate discharge port; the dehumidification device comprising:
   a dehumidification airflow passage comprising the dehumidification air inlet, the axial flow fan, the total heat exchanger, the evaporator, the total heat exchanger, and the dehumidification air outlet that are arranged and communicated in sequence;
   a heat dissipation airflow passage comprising the fresh air inlet, the condenser, the heat dissipation fan and the heat dissipation air outlet that are arranged and communicated in sequence;
   a refrigerant circulation loop comprising the compressor, the condenser, the throttle valve, the evaporator and the compressor that are arranged and communicated in sequence;
   a dehumidification water passage comprising the evaporator, the condensate collecting box, the drain solenoid valve and the condensate discharge port that are arranged and communicated in sequence;
   wherein the controller acquires real-time operating parameters of the dehumidification device through the liquid level sensor, the temperature and humidity sensor and the temperature sensor, and intelligently controls operation conditions of the compressor, the heat dissipation fan, the axial flow fan and the drain solenoid valve, to enable the dehumidification airflow passage, the heat dissipation airflow passage, the refrigerant circulation loop and the dehumidification water passage to operate coordinately to realize recovery of internal circulation waste heat, dehumidification and preservation of beneficial ingredients of a baked product for the hot air circulation baking system during the baking process.

2. The intelligent dehumidification device of the hot air circulation baking system according to claim 1, wherein
   the dehumidification air inlet and the dehumidification air outlet of the dehumidification air passage are respectively connected with a dehumidification discharge port and a fresh air intake port of the hot air circulation baking system through air ducts, and an airflow at the dehumidification discharge port of the hot air circulation baking system enters the total heat exchanger under the action of the axial flow fan, undergoes heat exchange with a dehumidified low temperature and low humidity airflow and is sent to evaporator for dehumidification, and then is returned to the fresh air intake port of the hot air circulation baking system through the dehumidification air outlet after heat exchange with an airflow entering through the dehumidification air inlet, to form an inner circulation loop which has no discharge and is able to recover waste heat during dehumidification and effectively preserve beneficial components of the baked product;
   the refrigerant circulation loop together with the heat dissipation airflow passage converts air energy introduced by the fresh air inlet into kinetic energy required for dehumidification of the evaporator to achieve energy-saving dehumidification;
   the liquid level sensor detects liquid level of condensate in the condensate collecting box, when the condensate liquid level is detected to reach an upper limit, the controller issues a control command to open the drain solenoid valve and drain through the condensate discharge port, and when the liquid level is detected to reach a lower limit, the controller issues a control command to close the drain solenoid valve to stop draining, to realize intelligent condensate draining.

3. The intelligent dehumidification device of the hot air circulation baking system according to claim 1, wherein
   the controller comprises a data acquisition module, a relay and a relay driving module, a main control CPU, a program and data memory, an LCD touch display screen, a communication interface, and a power management module;
   the data acquisition module is configured to collect temperature and humidity of hot air from the dehumidification discharge port of the hot air circulation baking system by the temperature and humidity sensor, collect temperature of the compressor during operation by the temperature sensor, and collect the liquid level in the condensate collecting box by the liquid level sensor,
   the relay and the relay driving module are configured to start or stop operation of the compressor, the axial flow fan, the heat dissipation fan and the drain solenoid valve according to an instruction of the main control CPU,
   the program and data memory is configured to store operating programs, baking process parameters and baking process data of the dehumidification device,
   the LCD touch display is configured to realize man-machine interaction for local setting and modifying the baking process parameters of the dehumidification device,
   the communication interface is configured to achieve remote communication with an upper computer to realize remote monitoring of the dehumidification process and remote configuration of the baking process parameters, the power management module is configured to obtain AC power from the utility power and convert the AC power to DC operation power required for the main control CPU and circuits peripheral to the main control CPU, and the main control CPU collects state parameters of the dehumidification process in real time through the data acquisition module and the sensor, obtains control quantity and outputs a control signal to the relay and the relay driving module according to the baking process parameters preset by the LCD touch display screen or the upper computer to control operations of the compressor, the axial flow fan, the heat dissipation fan, the drain solenoid valve to achieve automated and intelligent dehumidification process.

4. The intelligent dehumidification device of the hot air circulation baking system according to claim 1, wherein the controller is further configured to realize intelligent dehumidification of the hot air circulation baking system, and integrate program function modules for grid overpressure and under voltage detection and protection, compressor overheat protection, delayed start after compressor shutdown, automatic condensate discharge, remote monitoring and configuration and touch screen key value scanning, to reliably achieve intelligent dehumidification of the hot air circulation baking system.

* * * * *